Oct. 26, 1943.  C. V. SMITH  2,333,051
THICKNESS-SHRINKAGE CONTROLLED DIE ASSEMBLY
Filed Nov. 24, 1941
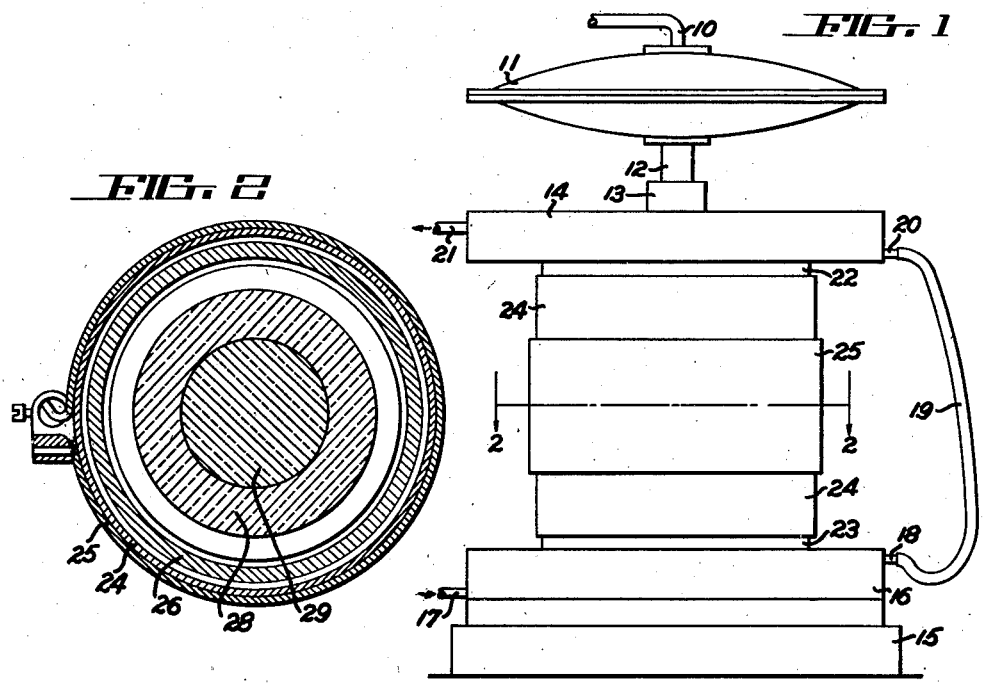
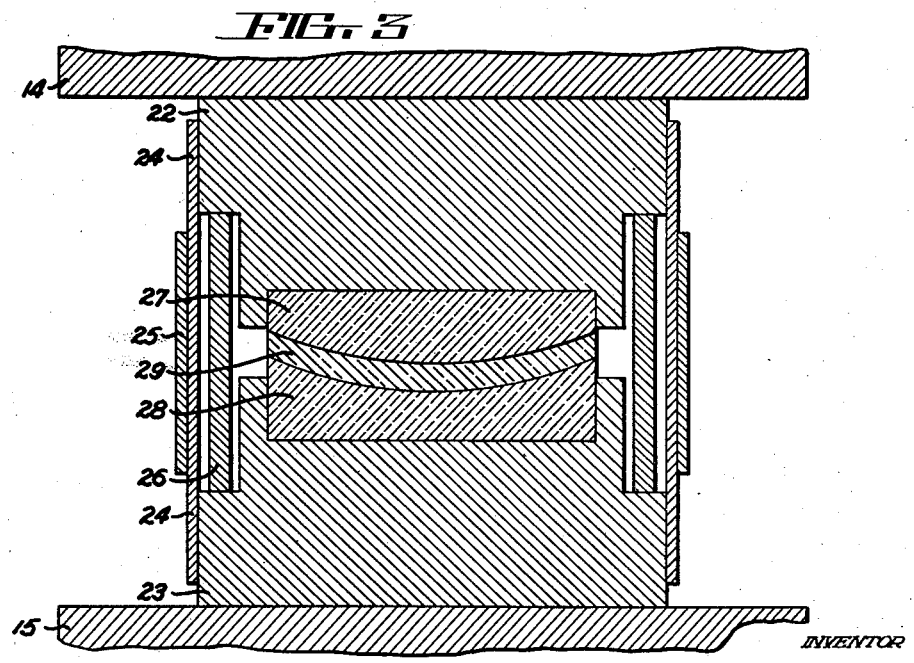
INVENTOR
CHARLES V. SMITH
ATTORNEYS Patented Oct. 26, 1943

2,333,051

UNITED STATES PATENT OFFICE 2,333,051

THICKNESS-SHRINKAGE-CONTROLLED DIE ASSEMBLY

Charles V. Smith, Dayton, Ohio, assignor to The Univis Lens Company, Dayton, Ohio, a corporation of Ohio Application November 24, 1941, Serial No. 420,193

8 Claims. (Cl. 18—34)

This invention relates to method and apparatus for producing optical articles and is a continuation-in-part of application Serial No. 360,436, filed October 9, 1940, of which I am one of the inventors.

More particularly, this invention deals with a thickness and shrinkage controlled die assembly adapted for use in forming optical articles from materials having suitable optical characteristics.

In the production of optical articles such as lenses, it is imperative that the surface contour and finish of the articles, as well as the optical perfection of the material from which such articles are made, be retained. This is particularly true when producing an optical article by forming a mass of material in such manner that the physical shape thereof is altered to a desired predetermined form.

Materials having the desired optical properties are characterized by the fact that they expand and contract with increase and decrease of temperature. Therefore, when an optical article is formed by subjecting to heat and pressure a mass of material having desirable optical properties, the resulting article will have a tendency to shrink upon cooling, and in order to preserve the shape imparted thereto and the surface finish thereof, it is required that the surfaces of the forming mold be retained firmly in contact with the surfaces of the article being formed until such time as it has set. In such cases where, due to improper technique or equipment ill-suited for the purpose, the formed mass of optical material leaves the surface of the mold as it cools and shrinks, the surface of the finished article will show imperfections of such nature that the article will be unsuited for use or sale as a quality optical article.

In application Serial No. 360,436 to which reference has been made hereinbefore, there is described, illustrated and claimed a method and apparatus for molding optical articles in which the die members are caused to follow up as the article formed therebetween shrinks on cooling. Various forms of control are described and claimed therein, all of which offer marked advantages over methods and apparatus therebefore employed for the purpose.

The present invention is directed to a further improvement of the method and apparatus described in said application. This invention is particularly adapted for use in combination with forming apparatus or dies for producing optical articles from thermoplastic material. Such articles may take the form of unbreakable lenses for ophthalmic or other purposes. It lends itself to the production of lenses in large quantities with an exceedingly high proportion of perfect lenses.

There are several points to be considered when lenses are formed from thermoplastic material. Such thermoplastic material must be carefully handled and processed in order to retain its desirable optical characteristics. When care is not exercised, the thermoplastic material may develop internal structural stresses and strains which will effectively destroy its desirable optical qualities. Furthermore, it is imperative that the surface of the finished lens be of a high degree of optical perfection in order that it may be used for ophthalmic and other purposes wherein only the highest types of lenses may be employed.

Hitherto surface perfection of the molded lens has been sought by the use of die members having extremely accurate and carefully finished significant surfaces and by extremely careful manipulation. In spite of such care in the selection, preparation and use of such dies it has not been possible regularly to obtain a high yield of perfect lenses in any given group produced commercially for the reason that the article formed between the die members has had a tendency to shrink at a rapid rate and in so doing has brought about changes in its internal structure and surface finish which have made it unsuitable for optical purposes.

The principal purpose of this invention is to provide a die assembly adapted automatically to control the thickness and shrinkage of an optical article formed between the die members, and particularly when such optical article is produced from thermoplastic material having desirable optical characteristics.

Referring now to the annexed drawing:

Fig. 1 is a diagrammatic front elevational view of a press such as used in forming optical articles from thermoplastic material;

Fig. 2 is an enlarged cross sectional view taken along the line 2—2 of Fig. 1; and Fig. 3 is an enlarged cross sectional view of the die assembly taken perpendicularly along its longitudinal axis.

In Fig. 1, 10 is a fluid line connected to a source of fluid (not shown) and to a diaphragm press 11; 12 is a shaft actuated by said diaphragm press and connected through a flexible connection 13 to a water-cooled platen 14. Still referring to Fig. 1, 15 is a base on which is mounted a water-cooled platen 16. Cooling water is introduced into platen 16 through pipe 17 and discharged through pipe 18. Pipe 18 is connected through a flexible hose 19 with inlet pipe 20 attached to platen 14 and cooling water is discharged from platen 14 through pipe 21. In other words, cooling water enters platen 16 through pipe 17, leaves through pipe 18 and flexible hose 19, enters platen 14 through pipe 20 and is discharged through pipe 21.

Still referring to Fig. 1, 22 and 23 are die cups or holders; 24 is a compressor band surrounding said die cups or holders; and 25 is a tension band surrounding said compressor band.

Referring now more particularly to Figs. 2 and 3, 26 is an expansion ring adapted to control the thickness and shrinkage of the molded optical article. 27 and 28 are die members resting, respectively, on die cups or holders 22 and 23, and 29 is the optical article (in this case a lens) being formed between the die members 27 and 28.

As an example of the application of the method and a form of the apparatus of my invention, I shall now describe the procedure which I follow in forming lenses.

A piece of thermoplastic material having desirable optical characteristics is placed between die members 27 and 28 held, respectively, in die cups or holders 22 and 23. The compressor band 24 is placed around the die cups or holders and the tension band 25 is then fixed thereover, thus forming a die assembly.

The die assembly is then heated, as in an oven, to a temperature and for a length of time sufficient to render plastic the thermoplastic material between the die members. The die assembly is then placed between the platens 14 and 16 and pressure is imposed on diaphragm press 11 by admitting fluid into it through fluid line 10. The pressure exerted by the diaphragm press 11 is transmitted through shaft 12 and flexible mounting 13 to platen 14. The flexible mounting 13 may be made of rubber or other resilient material.

Water is caused to flow through pipe 17 into platen 16 and out through pipe 18 and flexible hose 19 into platen 14 through pipe 20 and hence to be discharged through pipe 21. This flow of cooling water serves gradually to cool the die assembly.

It will be noted that compressor band 24 serves to align the geometric center of the die members and thereby obtain juxtaposition of said die members, thus insuring the production of a thermoplastic lens having the proper degree of thickness and desired curvature.

The expansion ring 26 is made of a metal such as brass or other material of known coefficient of expansion which will retain its physical characteristics under the conditions of temperature and pressure which the die assembly must undergo. It will be understood that when the die assembly is set up the expansion ring 26 is not in contact with both of the die cups or holders 22 and 23 in view of the fact that the thermoplastic material between the die members 27 and 28 has not, as yet, been subjected to pressure and become deformed. However, when the thermoplastic material has been deformed to form the optical article 29, the expansion ring 26 will be in intimate contact with die cups or holders 22 and 23, and the optical article 29 will likewise be in intimate contact with die members 27 and 28. The intimate contact between expansion ring 26 and die cups or holders 22 and 23 and between the formed optical article 29 and the die members 27 and 28 will remain in force throughout the cooling period and it is the purpose of this invention to have the expansion ring 26 controlled as to length in such manner that its shrinkage rate will correspond exactly with the combined shrinkage of the molded article 29, die members 27 and 28 and die cups or holders 22 and 23.

Assuming that the die cups or holders 22 and 23 are of steel having a coefficient of expansion of 10; that the die members 27 and 28 are of glass having a coefficient of expansion of 8; that the thermoplastic material from which the optical article 29 is formed has a coefficient of expansion of 80; and that the expansion ring is made of brass having a coefficient of expansion of 20, the total coefficient of expansion of the steel, the glass and the thermoplastic material will equal the coefficient of expansion of the expansion ring times the factor L which will be the length required for the expansion ring in order to insure that the die members 27 and 28 are kept in intimate contact with the formed optical article 29 throughout the entire cooling period, during which the optical article 29 is setting.

The factor L will hold for any temperature within the range used in forming optical articles from thermoplastic material in view of the fact that expansion is a linear function.

It will be understood by those skilled in the art that the amount of heat held by the die members 27 and 28 and the die cups or holders 22 and 23 is sufficient to maintain molding temperature for the time required to form the optical article 29 and that thereafter the molded article will slowly cool.

In the production of ophthalmic lenses the standard tolerance for thickness is plus or minus 0.002" for any given correction.

The expansion ring will contract faster than steel and glass but slower than thermoplastic material such as used in the production of ophthalmic lenses, and by making the length of the expansion ring sufficient to add up to the total expansion or shrinkage of the die menbers, die holders and thermoplastic material within the bounds of the ring length, every element will contract or expand conjointly or as a unit, and thereby the thermoplastic material will not pull away from the surface of the die members. When a molded lens pulls away from the surface of the die members, a shrinkage line is left on the surface of the lens and this shrinkage line destroys the value of the lens for ophthalmic purposes.

It will be understood that when pressure is applied to the die assembly the length of the expansion ring will determine the thickness of the lens produced from the thermoplastic material between the dies, and since the coefficient of expansion (or contraction) of the expansion ring is equivalent to the total of the thermoplastic lens, the die members and the die cups, the expansion ring will serve to control the shrinkage of the formed thermoplastic lens as the assembly cools down.

Where the ophthalmic correction requires prismatic compensation, it is possible to make the ring surface of such shape or contour that the required prismatic correction is impressed on the lens as it is formed. This is brought about due to the fact that the platen 14 is flexibly mounted (see flexible connection 13 in Fig. 1) and will follow the contour of the ring surface when pressure is applied thereon. It is thus seen that by applying the method and apparatus of my invention, it is possible to obtain thickness control, shrinkage control and prismatic correction concurrently and in a single operation.

The compressor band preferably used is in the form of a split ring having overlapping ends to permit relative movement between the said ends and the tension band is for the purpose of encircling the said compressor band for the purpose of holding it in position and determining the perimeter of the ring formed by the compressor band.

It will be understood that while I have described and illustrated a particular embodiment of my invention, I do not intend that my invention be limited to or circumscribed by the specific details and materials of construction, arrangement of parts and procedure in view of the fact that my invention may be modified according to individual conditions and preferences without departing from the spirit of this disclosure and the scope of the appended claims.

I claim:

1. A die assembly comprising: die holders adapted to receive die members; die members in association with said die holders; and an expansion ring having a coefficient of expansion expressed in any unit of measurement which multiplied by a factor L expressed in the same unit of measurement is substantially equal to the sum of the coefficients of expansion expressed in the same unit of measurement of the die holders, die members, and the article being formed between said die members positioned between spaced surfaces of said die holders, said ring being adapted to come in contact with said die holders as the pressing operation proceeds, whereby the thickness of said article is controlled according to the linear shrinkage of said expansion ring without said die members losing contact with the surface of said article, said factor L being equal to the length of said ring.

2. A die assembly comprising: die holders adapted to receive die members; die members in association with said die holders; and an expansion ring having a coefficient of expansion expressed in any unit of measurement which multiplied by a factor L expressed in the same unit of measurement is substantially equal to the sum of the coefficients of expansion expressed in the same unit of measurement of the die holders, die members, and the article being formed between said die members positioned between spaced surfaces of said die holders, said ring being adapted to come in contact with said die holders as the pressing operation proceeds, whereby the thickness of said article is controlled according to the linear shrinkage of said expansion ring without said die members losing contact with the surface of said article; and means adapted to maintain said die holders and die members in juxtaposition during the pressing operation; said factor L being equal to the length of said ring.

3. A die assembly comprising: die holders adapted to receive die members; die members in association with said die holders; an expansion ring having a coefficient of expansion expressed in any unit of measurement which multiplied by a factor L expressed in the same unit of measurement is substantially equal to the sum of the coefficients of expansion expressed in the same unit of measurement of the die holders, die members, and the article being formed between said die members positioned between spaced surfaces of said die holders, said ring being adapted to come in contact with said die holders as the pressing operation proceeds, whereby the thickness of said article is controlled according to the linear shrinkage of said expansion ring without said die members losing contact with the surface of said article; positioning means surrounding said die holders adapted to hold said die holders and die members in juxtaposition during the pressing operation, said factor L being equal to the length of said ring.

4. A die assembly comprising: die holders adapted to receive die members; die members in association with said die holders; an expansion ring having a coefficient of expansion expressed in any unit of measurement which multiplied by a factor L expressed in the same unit of measurement is substantially equal to the sum of the coefficients of expansion expressed in the same unit of measurement of the die holders, die members, and the article being formed between said die members positioned between spaced surfaces of said die holders, said ring being adapted to come in contact with said die holders as the pressing operation proceeds, whereby the thickness of said article is controlled according to the linear shrinkage of said expansion ring without said die members losing contact with the surface of said article; a compression band surrounding and in contact with said die holders adapted to maintain said die holders in juxtaposition during the pressing operation; and a tension band surrounding said compression band.

5. The method of producing optical articles which comprises: placing a mass of thermoplastic material between die members held in die holders; placing a ring of dissimilar material around said die members, said ring being adapted to come in contact with said die holders as the pressing operation proceeds, said ring having a coefficient of expansion expressed in any unit of measurement which multiplied by a factor L expressed in the same unit of measurement is substantially equal to the sum of the coefficients of expansion expressed in the same unit of measurement of said die members and thermoplastic material; applying pressure to said die members; causing the mass of thermoplastic material to set; and causing the die members to follow the shrinkage of the mass due to setting and maintain surface engagement therewith; whereby the optical surface of the article is preserved; said factor L being equal to the length of said ring.

6. The method of producing optical articles which comprises: placing a mass of thermoplastic material between die members held in die holders; placing a ring of dissimilar material around said die members, said ring being adapted to come in contact with said die holders as the pressing operation proceeds, said ring having a coefficient of expansion expressed in any unit of measurement which multiplied by a factor L expressed in the same unit of measurement is substantially equal to the sum of the coefficients of expansion expressed in the same unit of measurement of said die members and thermoplastic material; heating said die members, thermoplastic material and ring to a temperature sufficient to soften said thermoplastic material; applying pressure to said die members; causing the mass of thermoplastic material to set; and causing the die members to follow the shrinkage of the mass due to setting and maintain surface engagement therewith; whereby the optical surface of the article is preserved; said factor L being equal to the length of said ring.

7. The method of producing optical articles which comprises: placing a mass of thermoplastic material between die members held in die holders; placing a ring of dissimilar material around said die members, said ring being adapted to come in contact with said die holders as the pressing operation proceeds, said ring having a coefficient of expansion expressed in any unit of measurement which multiplied by a factor L expressed in the same unit of measurement is substantially equal to the sum of the coefficients of expansion expressed in the same unit of measurement of said die members and thermoplastic material; placing a positioning means around said die members and ring, whereby the geometric centers of said die members are brought into alignment; heating the resulting die assembly to a temperature sufficient to soften said thermoplastic material; applying pressure to said die members; causing the mass of thermoplastic material to set; and causing the die members to follow the shrinkage of the mass due to setting and maintain surface engagement therewith; whereby the optical surface of the article is preserved; said factor L being equal to the length of said ring.

8. The method of producing optical articles which comprises: placing a mass of thermoplastic material between die members held in die holders; placing a ring of dissimilar material around said die members, said ring being adapted to come in contact with said die holders as the pressing operation proceeds, said ring having a coefficient of expansion expressed in any unit of measurement which multiplied by a factor L is substantially equal to the sum of the coefficients of expansion expressed in the same unit of measurement of said die members and thermoplastic material; placing a positioning means around said die members and ring, whereby the geometric centers of said die members are brought into alignment; placing a locking means around said positioning means; heating the resulting die assembly to a temperature sufficient to soften said thermoplastic material; applying pressure to said die members; causing the mass of thermoplastic material to set; and causing the die members to follow the shrinkage of the mass due to setting and maintain surface engagement therewith; whereby the optical surface of the article is preserved; said factor L being equal to the length of said ring.

CHARLES V. SMITH.